United States Patent [19]

Olson

[11] 4,436,473

[45] Mar. 13, 1984

[54] DRIVE MECHANISM FOR A ROTATABLE SWEEP ARM

[75] Inventor: George E. Olson, Arlington Heights, Ill.

[73] Assignee: A. O. Smith Harvestore Products, Inc., Arlington Heights, Ill.

[21] Appl. No.: 365,495

[22] Filed: Apr. 5, 1982

[51] Int. Cl.³ .............................................. B65G 65/46
[52] U.S. Cl. .................................... 414/310; 74/416; 74/460
[58] Field of Search ................ 198/661; 414/310, 311, 414/312, 306; 74/415, 416, 431–433, 457, 460, 462

[56] References Cited

U.S. PATENT DOCUMENTS

| Re. 28,991 | 10/1976 | Laidig et al. | 414/310 |
| 3,403,795 | 10/1968 | Schaefer | 414/311 X |
| 4,072,062 | 2/1978 | Morling et al. | 474/153 X |
| 4,330,233 | 5/1982 | Weaver | 414/310 |

*Primary Examiner*—Robert G. Sheridan
*Assistant Examiner*—Janice Krizek

*Attorney, Agent, or Firm*—Andrus, Sceales, Starke & Sawall

[57] ABSTRACT

An improved drive mechanism for rotating a sweep arm in a storage structure that contains a free-flowing stored material. The inner end of the sweep arm is mounted on a turntable that is disposed in the inner end of a radially extending trough in the foundation of the storage structure. The turntable is provided with a pair of spaced, concentric, downwardly extending flanges, and a plurality of ribs connect the upper portions of the spaced flanges. The spaces between the ribs define upwardly diverging passages. A drive pin is positioned beneath each rib and extends between the spaced flanges. The teeth of a drive sprocket are engageable with the drive pins, and rotation of the sprocket acts to rotate the turntable and thus rotate the sweep arm around the structure to dislodge the stored material. As the drive sprocket is rotated, any stored material in the vicinity of the drive pins is extruded upwardly through the passages by the sprocket teeth to prevent possible jamming of the drive mechanism. In addition, the roots of the sprocket teeth are provided with relief and the sprocket teeth are tapered to aid in the removal of the stored material from the drive mechanism.

11 Claims, 5 Drawing Figures

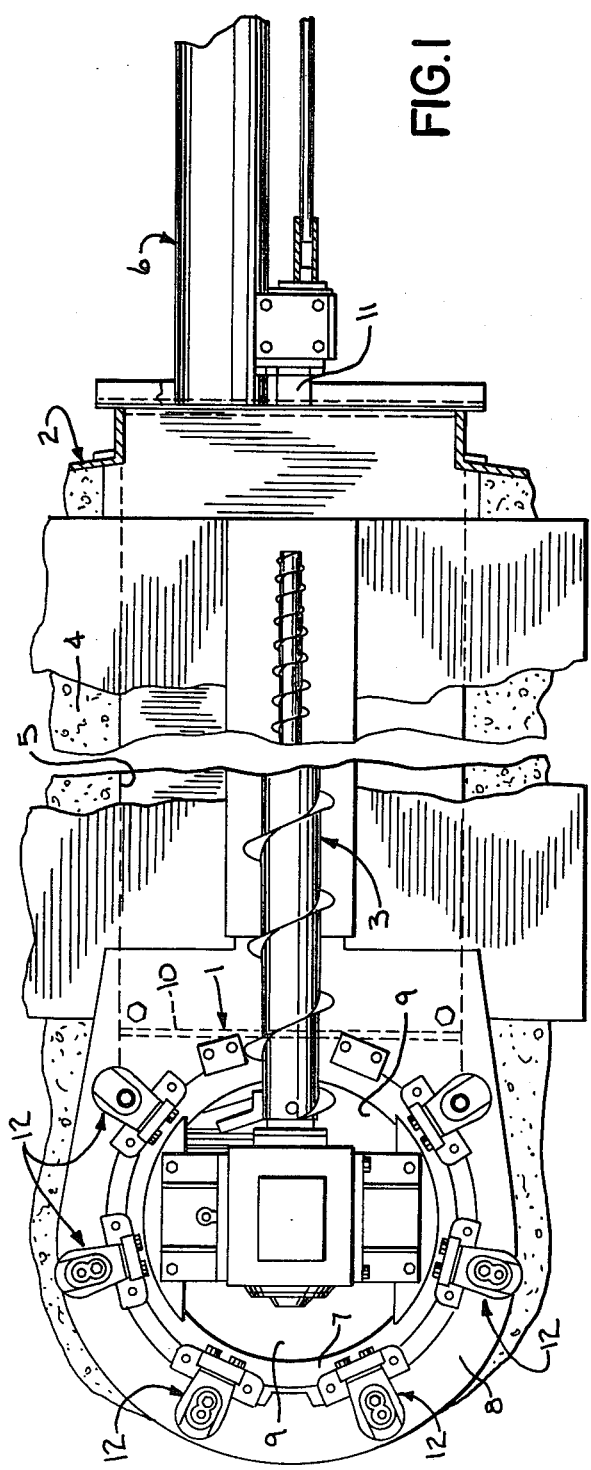
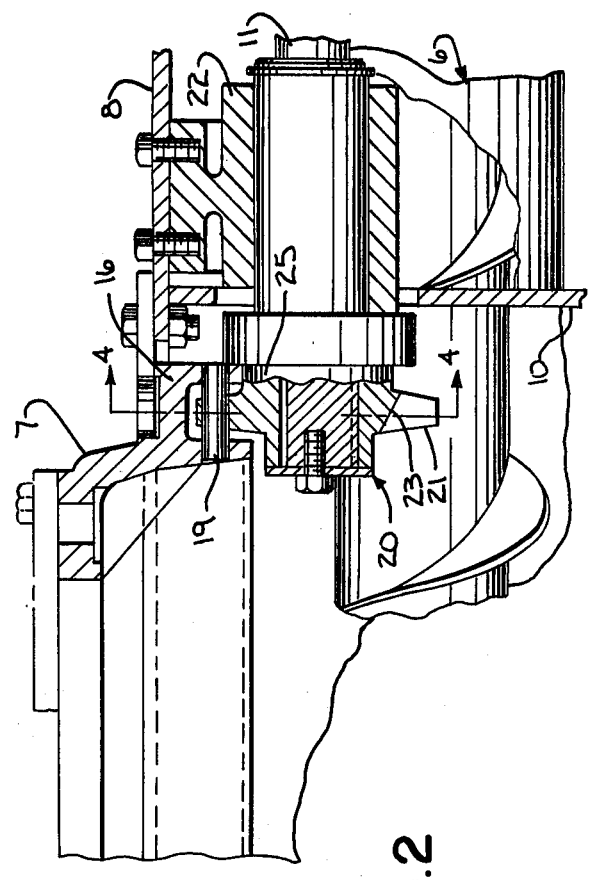

DRIVE MECHANISM FOR A ROTATABLE SWEEP ARM

BACKGROUND OF THE INVENTION

Grain and other relatively free-flowing, finely divided materials are frequently stored in air-tight silos or storage structures and are unloaded from the bottom of the silo through use of a bottom unloader. The copending U.S. patent application Ser. No. 205,461, filed Nov. 10, 1980, now U.S. Pat. No. 4,386,695, discloses a bottom unloader mechanism which includes an auger-type sweep arm that is mounted to rotate about the center of the silo and undercut the stored material and convey it to the center of the silo where it is delivered to a discharge auger that operates in a radially extending trough in the silo foundation. In an unloader of the type described in the aforementioned patent application, the inner end of the sweep arm is mounted on a turntable and is rotated in increments around the silo by a ratchet and pawl mechanism which interconnects a drive unit on the exterior of the silo with a drive shaft. The inner end of the drive shaft carries a drive sprocket that engages a series of drive pins on the turntable to rotate the turntable and the sweep arm around the silo. In addition, rotation of the discharge auger is transmitted through a gear drive located in the inner end of the trough to the sweep arm to thereby rotate the sweep arm about its axis as it sweeps about the silo.

With a bottom unloading mechanism of the type described in the above mentioned patent application, the stored material is delivered by the sweep auger to the center of the silo where it falls into the inner end of the trough. As the drive sprocket and turntable are located in the inner end of the trough, they are in continual contact with the stored material.

When dealing with a finely divided stored material, such as ground ear corn, grain, meat meal, starch, and the like, there is a tendency for the stored material to be compacted and build up in the turntable drive mechanism. A buildup of the compacted material in the drive elements of the turntable can result in stoppage or breakdown of the drive mechanism, and to relieve the jamming problem, it is necessary to remove the entire bottom unloading mechanism from the silo.

SUMMARY OF THE INVENTION

The invention is directed to an improved drive mechanism for rotating the sweep arm in the storage structure which eliminates jamming problems. In accordance with the invention, the turntable is provided with a pair of spaced, concentric, downwardly extending flanges, and a plurality of radially extending ribs interconnect the upper portions of the flanges. The spaces between adjacent ribs define passages which diverge in an upward direction.

Located beneath each rib is a drive pin which interconnects the flanges on the turntable.

The turntable is rotated by a drive sprocket having a plurality of teeth that engage the drive pins on the turntable. The sprocket has a zero pressure angle tooth form and a tooth angle that conforms to the angular orientation of the drive pins. In addition, the roots of the sprocket teeth are formed with a steep angle relief pocket to prevent material build-up in the root area of the teeth.

In operation, the sprocket teeth engage the drive pins to rotate the turntable and any stored material in the vicinity of the drive pins is forced upwardly through the relief passages and also downwardly along the relief pockets as the teeth engage the drive pins. The diverging configuration of the relief passages results in a pressure drop of the material being extruded to thereby prevent compaction of the material in the relief passages.

The drive mechanism of the invention serves to eliminate the compaction and build-up of finely divided stored materials in the region of the drive mechanism, thereby preventing jamming of the drive mechanism and the resulting maintenance problems.

Other objects and advantages will appear in the course of the following description.

DESCRIPTION OF THE DRAWINGS

The drawings illustrate the best mode presently contemplated of carrying out the invention.

In the drawings:

FIG. 1 is a plan view of a portion of a bottom unloading mechanism as mounted in a sealed silo or storage structure;

FIG. 2 is a vertical section of the turntable drive mechanism;

DESCRIPTION OF THE ILLUSTRATED EMBODIMENT

Figure 3:
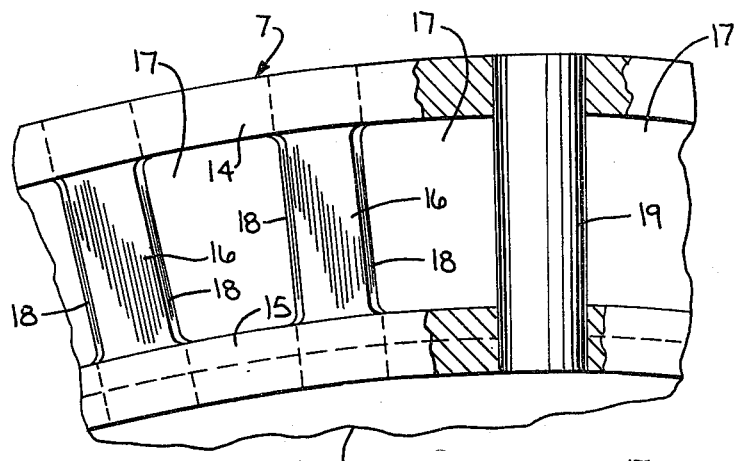
FIG. 3 is an enlarged fragmentary plan view of the turntable, with parts broken away, and showing the ribs and drive pins.

FIG. 1 illustrates a bottom unloading unit 1 which is disposed within a silo or storage structure 2 and is adpated to unload a relatively free-flowing material, such as ground ear corn, grain, meat meal, starch, or the like, from the structure.

As shown in FIG. 1, the unloading unit 1 includes a sweep auger 3 which is adpated to rotate about the center of the silo 2 over the foundation 4 and dislodge the stored material and convey it to the center of the silo where it is delivered to the inner end of a radially extending trough 5 formed in foundation 4. A discharge auger 6 operates within the trough 5 and acts to convey the stored material through the trough to the exterior of the silo where it is discharged.

The unloading unit, in general, is similar to that disclosed in U.S. patent application Ser. No. 205,462, filed Nov. 10, 1980, now U.S. Pat. No. 4,386,695. As disclosed in the above-mentioned patent application, a drive mechanism is mounted on the outer end of the discharge auger 6 and operates to drive sweep auger 3 about silo 2 and also to rotate discharge auger 6, which rotation, in turn, is transmitted to rotate the sweep auger 3 about its axis.

The inner end of sweep auger 3 is mounted on a turntable 7, which is located in the inner end of the trough 5. An annular plate or ring 8 is secured to the upper surface of the foundation 4 at the inner end of the trough, and ring 8 is provided with a central opening 9, which communicates with the inner end of the trough. The stored material being conveyed toward the center of the silo by sweep auger 3 will be discharged through the opening 9 into trough 5.

As shown in FIG. 2, a bulkhead 10 extends downwardly from ring 8 and is positioned radially outward of the opening 9. Bulkhead 10 extends transversely across trough 5 and is provided with openings which receive the discharge auger 6 and drive shaft 11, respectively.

To support turntable 7 for rotation, a series of roller assemblies 12 are mounted on ring 8.

Figure 4:
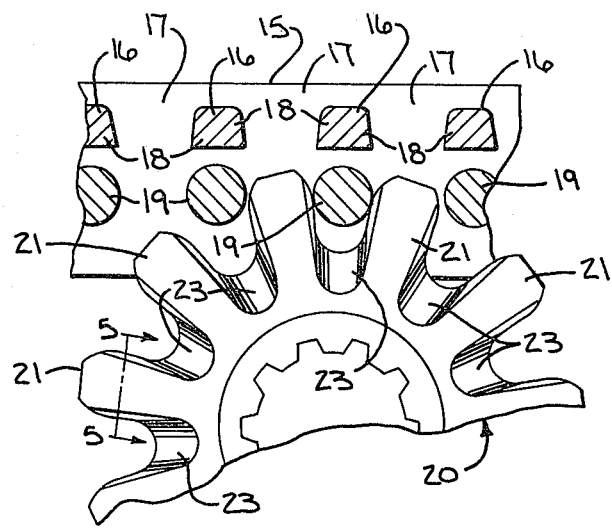
Fig. 4 is a section taken along line 4—4 of FIG. 2.

The turntable 7, as best shown in FIG. 2, includes a central section 13 which terminates in a pair of spaced, concentric, downwardly extending flanges 14 and 15. The upper portions of flanges 14 and 15 are connected by a series of spaced ribs 16 and the spaces between adjacent ribs define passages 17, as best shown in FIG. 4. As shown in FIG. 4, the ribs are generally trapezoidal in cross-section with the side surfaces 18 of each rib converging in an upward direction to thereby provide the upwardly diverging passages 17 between the ribs.

Located directly beneath each rib 16 is a drive pin 19 which interconnects the flanges 14 and 15.

Turntable 7 is rotated by a drive sprocket 20 having a series of teeth 21 that engage drive pins 19, as best shown in FIG. 4. Sprocket 20 is mounted on the end of horizontal shaft 11 which is journalled within a hanger bracket 22 carried by the ring 8. As previously noted, the shaft 11 is rotated in increments by a ratchet and pawl mechanism located on the outside of the storage structure, as disclosed in the aforementioned patent application.

Figure 5:
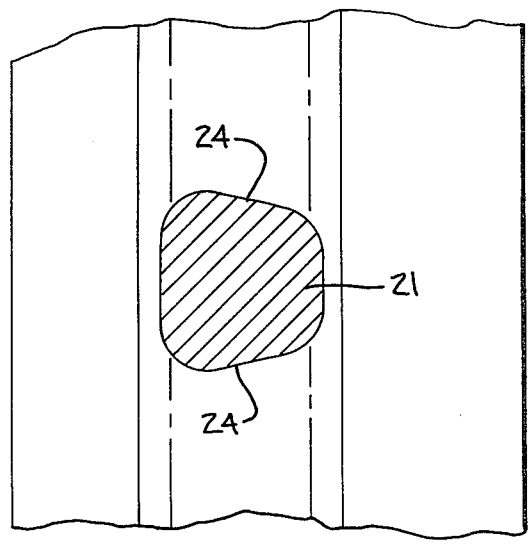
FIG. 5 is a section taken along line 5—5 of FIG. 4 and showing the cross section of a sprocket tooth.

As illustrated in FIGS. 2 and 4, a steep angle relief pocket 23 is formed in the root area of the teeth. In addition, as shown in FIG. 5, the side surfaces 24 of each tooth converge in a direction toward the center of the silo.

The outer portion of the sprocket 20 defines a cylindrical hub 25 which serves as a support roller for turntable 7. As illustrated in FIG. 2, the lower edge of the outer flange 14 rides on the hub 25.

In operation, as sprocket 20 is rotated, each tooth 21 engages the drive pins 19 to rotate turntable 7 and the sweep auger 3 about the center of silo 2. As the tooth engages the drive pin, the stored material is forced upwardly through the relief passages 17, as well as being forced downwardly through the relief pockets 23. The enlargement of the relief passages 17 on the exit side permits a pressure drop of the material being extruded, thereby preventing the buildup and compaction of the material in the passages.

The drive mechanism of the invention, by incorporating the relief passages 17, relief pockets 23, as well as the tapered side surfaces 24 on the sprocket teeth, prevents the compaction and build-up of the stored material in the area of the drive mechanism and, as such, greatly reduces maintenance problems caused by buildup and jamming of the drive.

Various modes of carrying out the invention are contemplated as being within the scope of the following claims particularly pointing out and distinctly claiming the subject matter which is regarded as the invention.

I claim:

1. In a storage structure to contain a stored material, a material dislodging and conveying member mounted for rotation in the structure about a vertical axis and disposed to dislodge the stored material and convey the dislodged material toward said axis, a turntable connected to the inner end of said dislodging and conveying member and including inner and outer concentric rings, said turntable also including a plurality of radially extending ribs connecting said inner and outer rings, adjacent ribs being spaced apart circumferentially to provide upwardly diverging passages therebetween, a plurality of radially extending drive pins interconnecting said inner and outer rings and disposed in spaced vertical alignment with said ribs, a drive member having a plurality of teeth disposed to engage said drive pins, and drive means for rotating said drive member, whereby rotation of said drive member will rotate said turntable and said dislodging and conveying member about said axis, said teeth acting to drive the stored material upwardly through said passages as said drive member rotates to thereby prevent jamming of said teeth by said stored material.

2. The structure of claim 1, wherein each rib includes a pair of tapered side walls that converge in an upward direction to provide said upwardly diverging passages.

3. The structure of claim 1, wherein the lower extremity of each of said ribs is approximately equal in circumferential dimension to that of the corresponding drive pin.

4. The structure of claim 1, wherein the ribs are spaced above the corresponding drive pins.

5. The structure of claim 1, wherein said drive member comprises a sprocket, the base portions of adjacent sprocket teeth being connected by root sections, said root sections having sloping relief pockets, said teeth acting to drive the stored material downwardly through said pockets as said sprocket rotates.

6. In a storage structure to contain a stored material, a material dislodging and conveying member mounted for rotation in the structure about a vertical axis and disposed to dislodge the stored material and convey the dislodged material toward said axis, a turntable connected to the inner end of said dislodging and conveying member and including a plurality of radially extending circumferentially spaced drive pins, a drive member having a plurality of teeth disposed to engage said drive pins, and drive means for rotating said drive member, said turntable including a plurality of vertically extending material conducting passages disposed in vertical alignment with the spaces between adjacent drive pins, the upper end of each passage having a greater cross sectional area than the lower end of said passage, said drive member comprises a sprocket, the base portions of adjacent sprocket teeth being connected by root sections, said root sections having sloping relief pockets, rotation of said drive member will rotate said turntable and said dislodging and conveying member about said axis, said teeth acting to drive the stored material upwardly through said passages and downwardly through said pockets as said sprocket rotates to thereby prevent jamming of said teeth by said stored material.

7. The structure of claim 6, wherein said turntable includes a pair of spaced concentric downwardly extending flanges, said drive pins extending between said flanges.

8. The structure of claim 6, wherein said pockets face toward said vertical axis.

9. The structure of claim 6, wherein each of said teeth is provided with a pair of side surfaces that are engageable with said drive pins, the side surfaces of each tooth tapering inwardly in a direction toward said vertical axis.

10. In a storage structure, a vessel to contain a stored material, a foundation to support the vessel, a sweep auger mounted for rotation on the foundation about the center of the vessel, said auger acting to dislodge the stored material and convey the stored material toward the center of the vessel, a turntable connected to the inner end of said auger and mounted to rotate about said center, said turntable including a pair of spaced concentric downwardly extending flanges and a connecting section connecting the upper portions of said flanges, a plurality of radially extending circumferentially spaced drive pins extending between said flanges and spaced beneath said connecting section, said connecting section including a plurality of vertically extending material conducting passages disposed in vertical alignment with the spaces between adjacent drive pins, the upper end of each passage having a greater cross sectional area than the lower end of said passage, a drive member having a plurality of teeth disposed to engage said drive pins, and drive means for rotating said drive member whereby rotation of said drive member will rotate said turntable and said auger, said stored material being driven upwardly through said passages as said drive member drives said turntable.

11. The structure of claim 10, wherein said drive member comprises a sprocket, the base portions of adjacent sprocket teeth being connected by root sections, said root sections having sloping relief pockets that face toward the center of said silo, said teeth acting to drive the stored material downwardly through said pockets as said sprocket rotates.

* * * * *